Oct. 26, 1948.  C. J. CRANE  2,452,038
PHOTOELECTRIC RADIO COMPASS TRAINER CONTROL
Filed March 12, 1940  4 Sheets-Sheet 1
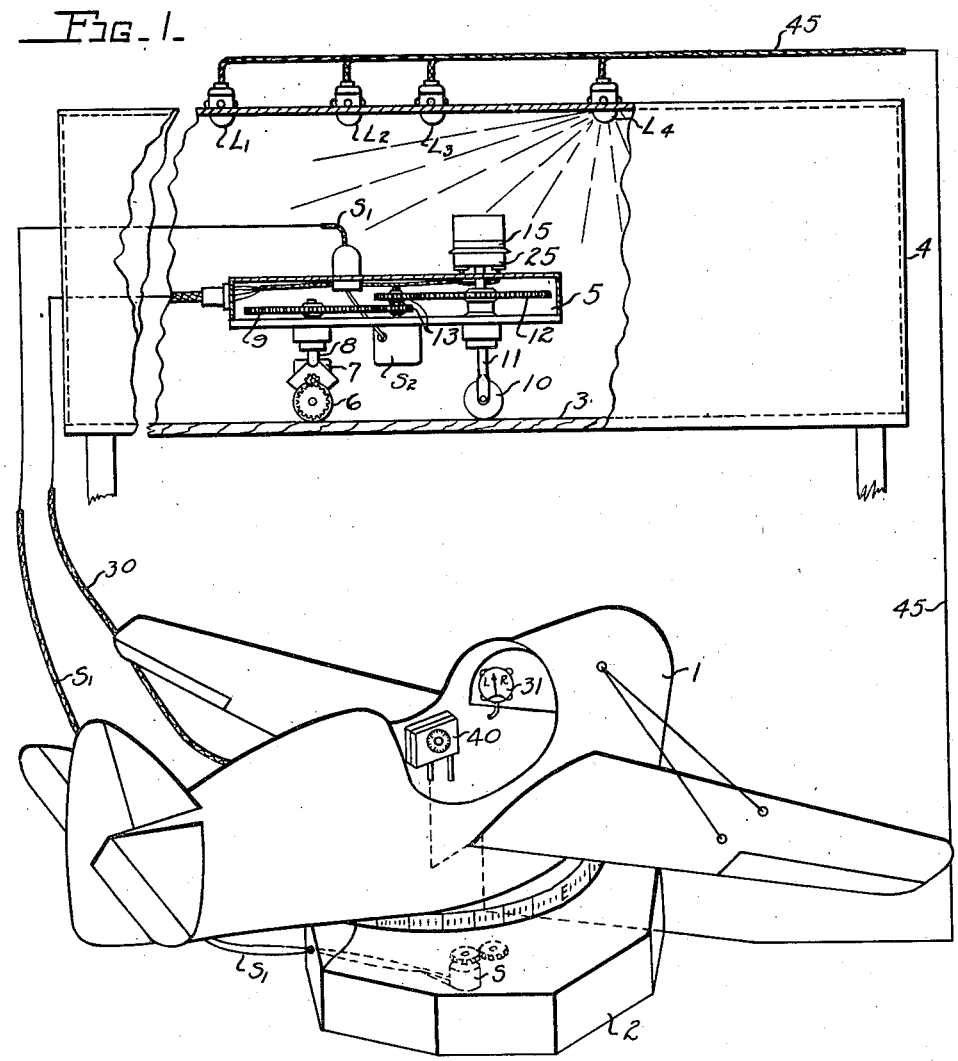

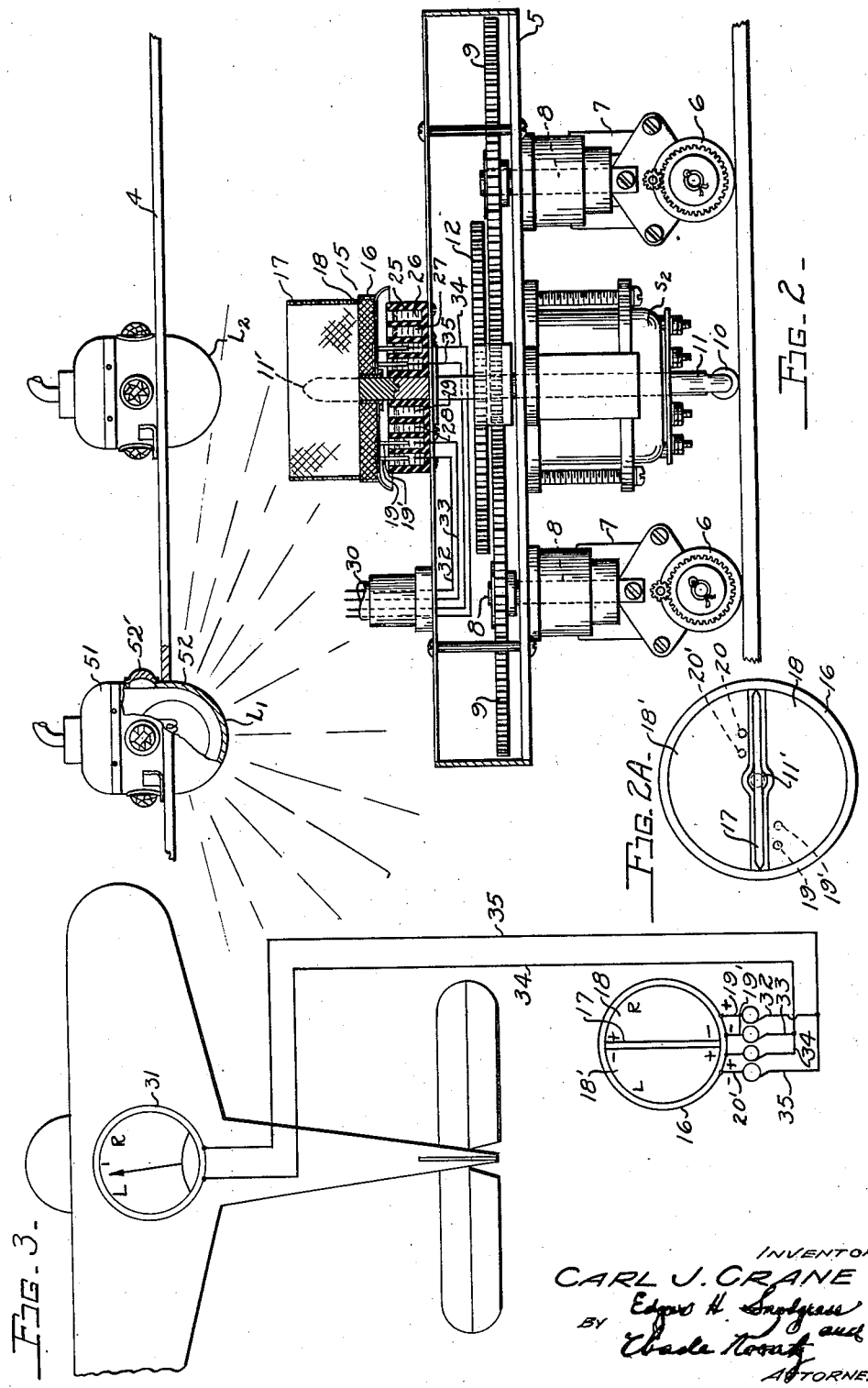

Oct. 26, 1948.                C. J. CRANE                2,452,038
          PHOTOELECTRIC RADIO COMPASS TRAINER CONTROL
Filed March 12, 1940                              4 Sheets-Sheet 4
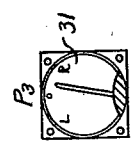
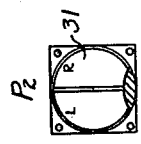
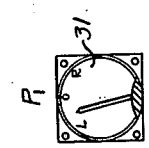
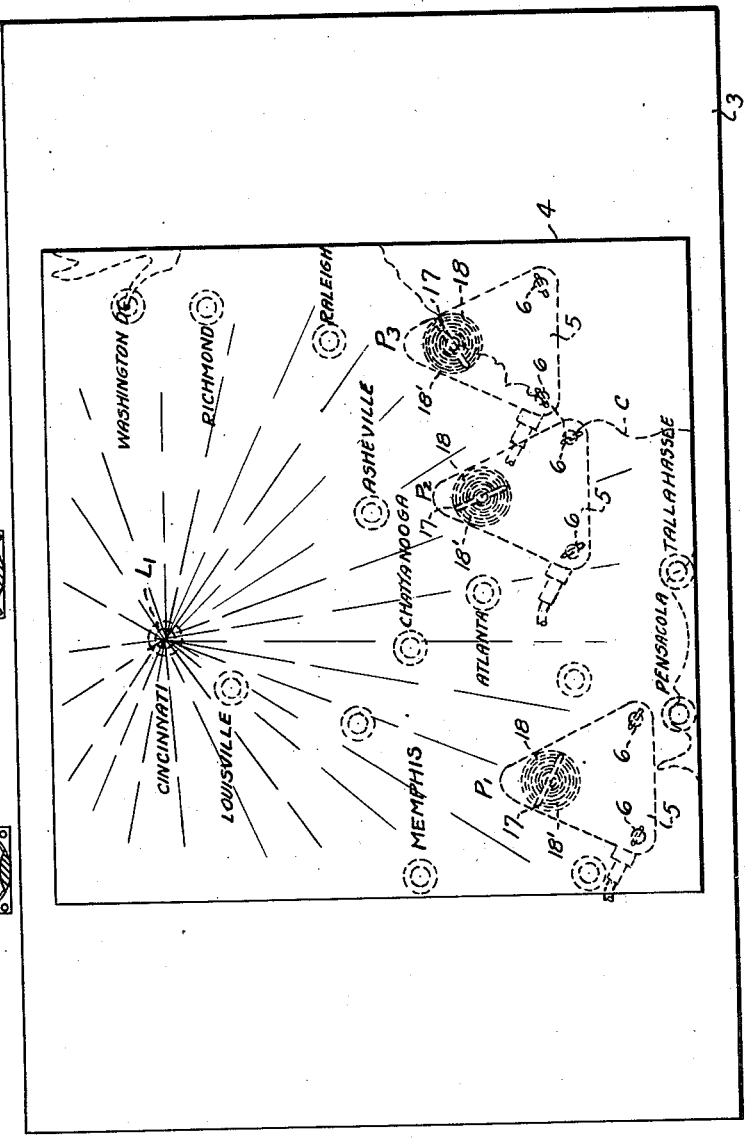
FIG. 5.
INVENTOR
CARL J. CRANE
BY Edgar H. Snodgrass
and Wade Koontz
ATTORNEYS Patented Oct. 26, 1948

2,452,038

UNITED STATES PATENT OFFICE 2,452,038

PHOTOELECTRIC RADIO COMPASS TRAINER CONTROL

Carl J. Crane, Dayton, Ohio

Application March 12, 1940, Serial No. 323,561

12 Claims. (Cl. 35—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to auxiliary apparatus for use in conjunction with aviation ground trainers and more particularly relates to a means for simulating the radio navigational aid employed in aircraft, known as the radio compass.

Aviation ground trainers for instructing students in the art of instrument flying are well known in the art and such trainers generally comprise a grounded dummy aircraft, tiltably and rotatably mounted on a base and controllable by the occupant in a manner to simulate all of the normal flight maneuvers of an airplane. Various instruments are provided for indicating the flight attitude and the directional heading of the trainer. For a more detailed description of one form of trainer of the type above described, reference may be made to United States Patents No. 1,825,462 and No. 2,099,857 granted to Edwin A. Link, Jr.

It is customary to employ an automatic course indicator, or recorder in conjunction with aviation ground trainers of the type above described, to trace the course of the simulated flight of the trainer on a record sheet such as a chart, or map, representing the trainer over which the simulated flight is taking place. The course indicator, or recorder comprises a frame supported on rollers and movable over the reference surface. The rollers, generally three in number, are each steerable and interconnected by gearing to the receiver unit of an electrical motion transmission, which is electrically connected to a corresponding motion transmitter unit, driven by the trainer as it rotates about a vertical axis. The changes in heading of the trainer thus cause equal changes in heading of the course indicator. Two of the supporting rollers of the course indicator are provided with power driving means consisting of small electric motors geared to the rollers and rotatable with the rollers about their steering axes. The motors drive the course indicator over the record surface at a velocity proportional to the simulated velocity of the ground trainer. The third roller may be inked by a felt pad and record the indicator path on the chart. The position of the marker roller serves the function of an indicator apart from its marking function. For a more detailed description of such a course recorder, or indicator, reference may be had to United States Patent No. 2,179,663 granted to Edwin A. Link, Jr.

One form of manually controlled radio compass indicating device for use with an aviation ground trainer and automatic recorder is known in the art and comprises an indicator mounted in the trainer cockpit and electrically connected to a potentiometer mounted on the course recorder, so that the resistance windings thereof, rotate with the marker wheel steering mechanism. The potentiometer has a sighting device which is attached to the contact arm of the potentiometer and the instructor must keep the sighting device pointing towards an assumed radio station point on the reference chart. When the movement of the course indicator is along a line directly toward or away from the radio station point, the indicator remains centered, while if the heading is to the right, or left of the station point, the indicator will so indicate, the indications being reversed on movement away from the station point. In order to function properly, it is essential, that the instructor continually watch and manipulate the radio compass device and hence cannot devote his attention to other phases of the trainer flight and any errors of observation on the part of the instructor will cause a similar error in the indication given the student in the trainer.

The present invention relates to a means to automatically actuate a radio compass indicator in a ground trainer by photoelectric means so as to relieve the instructor of the duty of manually controlling such an indicator and eliminate the errors attending such manual control.

The principal object of the invention is the provision in an aviation ground training system, of an aviation ground trainer having a radio compass indicator mounted therein, a course indicator directionally controlled by the trainer, a light source located at a point over the recorder reference surface, representing a radio transmitting station and photoelectric means carried by said recorder and connected to the indicator, the photoelectric means cooperating with the light source to indicate the heading of the recorder relative to the source, to thereby simulate the action of a radio compass, as employed in aircraft.

A further object of the invention is the provision of a plurality of light sources over a record table traversed by an aviation ground trainer course indicator, the course indicator having mounted thereon, a photoelectric device, which cooperates with a selected one of said sources to cause a radio compass indicator to indicate the heading of the course indicator relative to the light source and a means mounted in the trainer for selectively energizing any one of the light sources.

Other objects of the invention will become apparent by reference to the specification and the appended drawings in which:

Fig. 1 illustrates partly in section a schematic assembly of the elements of the invention.

Fig. 2 illustrates an enlarged view showing the details of the recorder and mounting of the photoelectric device as employed in Fig. 1.

Fig. 2A is a top plan view of the photoelectric cell illustrated in Fig. 2.

Fig. 3 is a schematic showing of the circuit connecting the indicator and the photoelectric device, as employed in the device of Fig. 1.

Fig. 5 is a top plan view of the device of Fig. 1 illustrating different positions of the recorder relative to a given light source and the indicator indications corresponding to each position.

Figure 4:
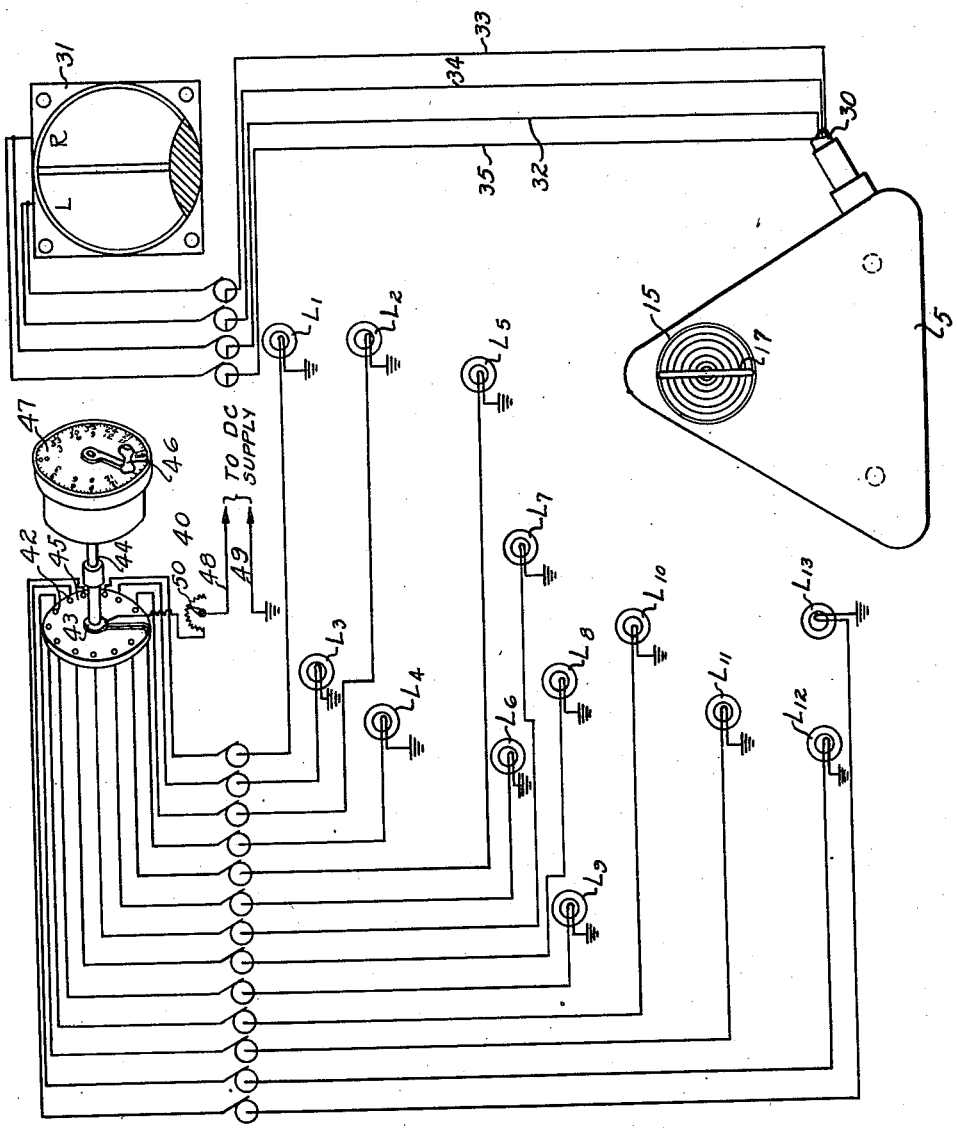
Fig. 4 is a schematic showing of the control system for controlling the various light sources employed in the device of Fig. 1 and further shows a view of the photo-electric device connected in a circuit such as illustrated in Fig. 3.

Referring to Fig. 1, the numeral 1, indicates an aviation ground trainer of the type above described, tiltable and rotatable about the base 2, under the control of the occupant of the trainer. The trainer 1, has a "Selsyn" transmitter S, the rotor of which is rotated by the trainer as it changes its heading and the "Selsyn" transmitter S, is electrically connected by a cable $S_1$, with a corresponding "Selsyn" receiver $S_2$, mounted on the frame of the course recorder, or indicator 5 and connected by pinion gears 13, to the roller steering gears 9 and 12, respectively. The course recorder or indicator 5, is provided with a pair of spaced supporting rollers 6, steerably supported on vertical shafts 8, carried by the recorder frame. The rollers 6, are driven from small electric motors 7, supplied from an electrical source (not shown), to drive the course indicator, or recorder 5, over the surface of the record or chart table 3, at a velocity proportional to the simulated flight velocity of trainer 1. The motors are mounted on the shafts 8 and are rotatable therewith. The steering gears 9, are mounted on the upper ends of the respective shafts 8. A marker roller 10, is mounted on a vertical shaft 11, supported by the recorder frame and the marker roller when inked by a felt pad (not shown), serves to record the path of the recorder on a suitable map placed on the record table 3. The position of the course recorder is at all times indicated by the point of contact of the marker wheel 10, with the record chart on the table 3 and hence the term course indicator, generally applies to the recorder 5 irrespective of whether or not the marker wheel 10 is used as a recording means. It is thus seen, that the course indicator 5, will accurately follow a course under the directional control of the trainer 1, at a velocity proportional to some predetermined simulated velocity of the trainer.

A photo-electric device generally indicated by the reference numeral 15, is mounted on the upper end of the shaft 11, of the marker wheel 10, and is rotatable with the shaft 11, and cooperates with a commutator device generally indicated by the reference numeral 25, which is electrically connected by a cable 30, with the radio compass indicator 31, mounted in the cockpit of the trainer 1. The photo-electric device 15, cooperates with any one of a plurality of light sources $L_1$, $L_2$, $L_3$, $L_4$, etc., to cause the indicator 31, to indicate the instant heading of the course indicator 5, relative to a selected one of the light sources, in a manner hereinafter described. The light sources are small electric exciter lamps, which are mounted as shown on a hood 4, which completely encloses the record surface of the table 3, and prevents external light from affecting the photo-electric device 15, and the interior surfaces of the hood is painted with a light absorbing coating. The light sources $L_1$, $L_2$, etc., are located over desired points on the reference surface 3, so that their location represents the position of various assumed radio transmitting stations on the reference chart. The light sources $L_1$, etc., are each connected by a cable 45, to a control switch assembly generally indicated by the reference numeral 40, mounted in the trainer cockpit, so that a desired one of the light sources may be energized by control from the trainer cockpit. The operation of the switch control 40, simulates the operation of a radio compass receiver in an actual aircraft flight.

Referring to Figs. 2 and 2A, the photo-electric device 15, comprises a cup shaped container 16, made of an insulating material and mounted on a stem 11', made of insulating material and rigidly mounted on the upper end of the marker wheel shaft 11, to rotate therewith. The container 16, has secured therein a pair of semi-circular light sensitive cells 18 and 18', respectively, which have output leads 19, 19' and 20, 20', respectively made in the form of metal pins secured in the container 16. The light sensitive surfaces of the cells are separated by a dividing screen 17, which is coated with a black light absorbing coating. The entire photo-cell assembly 15, is rotatable with the marker wheel as it changes its heading under the control of the trainer 1. The light sensitive cells employed, are of the well known Weston "Photronic" type and are used, because cells of this type do not require any battery, or other power source, the current due to photo-electric effects being sufficient to actuate a sensitive meter without the necessity of any external battery. It is to be understood, however, that any other type photo-cell such as alkali metal or "selenium" cells may be used, employing the usual battery source in conjunction therewith. The term photo-cell as used herein, is intended to be generic to both types of cells.

A mercury contactor device, or commutator device, generally indicated at 25, comprises a circular block of insulating material, secured to the frame of the course indicator 5 and having four annular channels 26, 27, 28 and 29, formed therein, concentric with the axis of the marker wheel shaft 11. The channels 26, 27, etc., are each filled with mercury to such a depth, that one of the respective leads 19, 19', 20 and 20' will be partially immersed therein. The conductor pins 19 and 19', dip in the mercury contained in the annular channels 26 and 27, respectively and the conductor pins 20 and 20', respectively, dip in the mercury contained in the annular grooves 28 and 29. The mercury in each of the annular grooves 26, 27, 28 and 29, is respectively in contact with conductors 32, 33, 34 and 35, which are connected in the form of a cable 30, to the radio compass indicator 31, of Fig. 1. It is thus seen, that by means of the commutator device 25, the current generated by "photronic" cell 18, may pass by way of conductor pins 19 and 19', to leads 32 and 33 and similarly, current generated by "photronic" cell 18', may pass by way of conductor pins 20 and 20', to the conductors 34 and 35, by means of the mercury in the grooves 26, 27, etc., with a minimum of electrical resistance, but permitting free rotation of the photo-cell assembly 15, with the marker wheel shaft 11.

As seen in Fig. 3, the positive conductor pin 19, of "photronic" cell 18, is connected by conductor 32, to the lead 35, connected to the negative conductor pin 20', of the "photronic" cell 18'. Similarly the negative conductor 19', of "photronic" cell 18, is connected by conductor 33, to the lead 34, connected to the positive conductor pin 20, of cell 18'. Extensions of leads 34 and 35, are connected to the terminals of a sensitive zero center type meter 31. By inspection of the circuit, it will be seen, that the cells 18 and 18', are connected to each other in series and in electrical opposition, so that if each cell is producing a current of equal magnitude there will be no potential difference existing between the extended leads 34 and 35, connected to meter 31, and the indicator pointer will remain centered. If cell 18, delivers a current greater than cell 18', a current will flow through the indicating meter 31, in one direction, causing the pointer to deflect in one direction, for example to the left, while if cell 18', delivers the greater current the current flow through the indicator meter 31, will be in the opposite direction and the pointer will then deflect to the right. Since the current generated by a photronic cell is proportional to the intensity of light falling upon it, the cells 18 and 18', will generate equal currents when the same intensity of light strikes each cell and hence under such conditions, the pointer of indicator 31 will remain centered as described above. If cell 18, receives light with a greater intensity than cell 18', the pointer of indicator 31, will deflect to the left and similarly if cell 18', receives the greatest amount of light, the pointer will deflect to the right. The pointer deflections may be reversed from that above described by simply reversing the connections to indicator meter 31, or a reversing switch may be used.

As seen in Fig. 4, the various light sources, or exciter lamps L1, L2, L3, etc., each have one filament terminal respectively connected to one of the points 42, of a rotary switch 45 and the other filament terminals are each grounded to a power supply lead 49. The other power supply lead 48, is connected through rheostat 50 to the rotatable switch arm 43. The switch arm 43, is rotated by a shaft 44, turned by a control handle 46, which also serves as a pointer to cooperate with the dial 47, which is provided with suitable indicia, to indicate the particular exciter lamp being energized from the power supply leads 48 and 49, which are adapted to be connected to a suitable power source, preferably of the direct current type (not shown). The rotary switch 45, dial 47 and control handle 46, are mounted as a unit 40, in the cockpit of the trainer 1, as illustrated in Fig. 1. The construction of the rotary switch 45, as seen in Fig. 4, is such that only one exciter lamp may be energized at any one time; and this is essential, since if more than one exciter lamp is lighted, the co-mingling of the light from the two sources will give a resultant light distribution such that under certain conditions the apparent source of radiation would be at some point other than at either of the actual sources of light, thus giving rise to erroneous results. The operation of the switch 45, by turning the control handle 46, to select the desired exciter lamp representing the desired radio compass station, simulates the tuning of a radio compass receiver to a particular station, which in actual flight is to serve as the desired radio compass homing, or bearing station. As best seen in Fig. 2 the exciter lamps L1, etc., are each encased in a suitable protecting casing 51, having a transparent portion 52, extending within the hood 4 and the casing is provided with small colored bulls eye lens 52' located externally of the hood 4, so that the respective light source being energized will immediately be apparent to the instructor. If desired, a remote indicator may be actuated by the shaft 44, of the switch unit 40, to indicate the respective light source being energized.

Fig. 4 further illustrates the connection of the photo-cell device 15, to the indicator 31, the connections illustrated in Fig. 3 between the 32, 33, 34 and 35, actually being made at the indicator 31, so as to be readily accessible, the leads 32, 33, 34 and 35, being enclosed in the cable 30, previously described.

*Operation*

The operation of the photo-electric radio compass for ground trainers, above described, can best be seen by reference to Fig. 5, which schematically illustrates a top plan view of the record table 3, which has the hood 4, placed over a portion thereof. A suitable chart, or map C, is placed on the record table and the vertical lines passing through the various light sources L1, L2, etc., intersect the chart at positions representing various cities, which may be desired destinations and assumed to be radio station broadcasting points for use in homing with the radio compass indicator. The various assumed positions of the course indicator 5, during operation, are indicated as positions P1, P2, and P3, respectively. The deflections of the indicator 31, for the various course indicator positions, are indicated in the indicator illustrations P1, P2, P3, above the table 3.

Assuming that the simulated destination is Cincinnati represented by exciter lamp L1, and that the course indicator 5, is in operation with the heading indicated by the plane of rollers 6 and the light dividing screen 17. The student desiring to home towards Cincinnati, actuates the switch control 40, in the trainer cockpit to energize exciter lamp L1. It will be seen that in position P1, light radiated from exciter lamp L1, will strike "photronic" cell 18, without hindrance but will be partially shielded from "photronic" cell 18', by the dividing screen 17 and since cell 18, receives light of greater intensity than cell 18', the pointer of indicator 31, will deflect to the left as above described with reference to Fig. 3. It is thus seen that the indicator 31, will correctly indicate the heading of the course indicator and trainer relative to the assumed radio compass transmitting station represented by the point on the chart directly beneath exciter lamp L1. The course indicator may then be considered in operation in position P2 and it will be seen, that the heading as indicated by the plane of the rollers 6 and dividing screen 17, is such, that the "photronic" cells 18 and 18', will receive light with equal intensity and for reasons as stated above, with reference to the description of Fig. 3, the pointer of indicator 31, will be centered, indicating that the course is directly towards the assumed radio compass station. Similarly in position P3, the cell 18', will receive light with a greater intensity than cell 18 and the pointer of indicator 31, will deflect to the right, indicating that the course indicator is heading to the right of the assumed radio compass station point represented on the chart by Cincinnati. It will be noted that in the various positions P1, P2, or P3, the indication will be the same, regardless of whether the course indicator is moving along its heading axis either toward, or away from, the assumed radio compass transmitting station Cincinnati and in order to determine the position of the assumed transmitting station, the trainer is turned to the right and if the indicator pointer deflects toward the right from its instant position the station is ahead in the direction of motion of the course indicator, while if the deflection is to the left the assumed transmitting station is to the rear in the direction of motion from the course indicator. The authorities are not agreed on the relation between pointer deflection and direction of heading to the right or left of the radio compass station and the left and right deflections may be interchanged by simply reversing the indicator connections, so as to agree with conventions of the navigating system being used.

The student during the trainer flight, attempts to maintain the trainer heading such, that the radio compass indicator pointer remains centered, after determination of the sense of the direction of light transmission to determine whether the direction of the simulated flight is directly towards, or away from the assumed transmission station point. As the course indicator approaches the vertical axis of the light source, the sensitivity of the indicator for a given deviation from the on course heading is greatly increased, since the light intensity will vary inversely as the square of the distance from the light source. By proper selection of the type of the exciter lamps and proper adjustment of their vertical height above the reference table surface, the light distribution may be made such, that its effect on the "photronic" cells will closely simulate the variation in signal intensity with distance from the transmitting station, experienced in actual aircraft flight and the radiation of light will under proper control be substantially equal in all directions in a horizontal plane, duplicating the non-directional radiation of the radio waves from radio compass transmitting stations, which very often are the ordinary radio broadcasting stations.

In order to simulate the actuation of the volume control of a radio compass receiver to obtain an approximate idea of distance from the transmitting station, a rheostat 50 is inserted in the power supply circuit 48—49, for the various exciter lamps $L_1$, $L_2$, etc., as illustrated in Fig. 4. The rheostat is preferably mounted in the cockpit of the trainer so that its control knob is in close proximity to the exciter lamp selector switch control 46 and by control of the rheostat 50, the intensity of light radiated by the selected one of the exciter lamps $L_1$, $L_2$, etc. can be controlled by the student so that the deflection of the pointer of the indicator 31, may be controlled similar to the effect of varying the receiver volume in an actual radio compass system employed on an aircraft. As the course indicator 5, approaches the light source selected to represent the desired transmitting station, the pointer of indicator 31, will deflect an ever increasing amount, for a given small deviation from a heading directly towards the chosen light source. If the student then reduces the intensity of light radiated by the active exciter lamp by actuating the rheostat control 50, so that the pointer deflection remains constant at some selected value, the amount the knob of rheostat 50, is moved, may be interpreted in terms of distance from the transmitting station, in the same manner as distance from the transmitting station is approximated by actuation of the volume control of the radio compass receiver by an aircraft pilot.

The radio compass simulating means above described, may be used to home on any one of the various destinations represented by the various exciter lamps and the apparatus will faithfully reproduce indications simulating an actual radio compass as used in aircraft navigation. The photo-electric radio compass for aviation ground trainers above described may also be used in simulated blind landings with the trainer where two aligned light sources may be employed in a manner to simulate the two radio compass stations aligned with the landing runway, employed in the Army Air Corps Blind Landing System. The two aligned light sources are respectively mounted directly above points on the reference surface spaced at predetermined distances from a point on the said surface representing the boundary of an assumed airport landing runway; and the light sources, as above noted, are aligned with the axis of the simulated landing runway on the record chart. The light sources then respectively represent the inner and outer radio compass transmitter stations employed in the above-noted Army Air Corps Blind Landing System; and the student in the trainer may then simulate flight toward either the inner or the outer radio compass station by energizing the corresponding exciter lamp and maintaining the trainer heading such that the course indicator heads towards the selected station point on the record chart, the deviation from the proper heading being indicated by the indicator 31. The course indicator may be directionally aligned with the axis of the landing runway on the record chart and moving in a direction such as to make a proper simulated landing by the procedure outlined in the copending application Serial No. 320,879, filed February 26, 1940, for improvements in Blind flying and blind landing system for aviation flight trainer, in the names of Carl J. Crane, George V. Holloman, Carl W. Muller, and Raymond K. Stout, which application also discloses the use of marker beacon simulating signals energized by the recorder when arriving at the respective radio compass station points and forming one of the essential features used in combination with radio compass simulating means for making a simulated instrument landing in accordance with the Army Air Corps System. The flight procedure for carrying out an instrument landing in accordance with the Air Corps System is fully described and illustrated in the Air Commerce Bulletin of the U. S. Department of Commerce, vol. 6, No. 5, entitled "Army Air Corps Radio Blind Landing System Adopted as Standard."

While one form of the invention has been illustrated and described, modifications will become apparent to those skilled in the art, falling within the scope of the invention as defined by the appended claims.

I claim:

1. In combination, an aviation ground trainer for simulating the flight of an aircraft, a reference surface, a course indicator movable relative to said reference surface at a velocity proportional to the simulated velocity in flight of said aircraft and directionally controlled by said trainer, a light source for radiating light over said reference surface symmetrically with respect to a point on said reference surface representing the location of a simulated radio station, a photo-electric device mounted on said course indicator and controlled by said indicator to receive light transmitted from said source in accordance with the heading of said course indicator relative to said simulated radio station point on said reference surface, an indicator in said trainer electrically connected to said photo-electric device for indicating the heading of said course indicator relative to said simulated radio station point.

2. The structure as claimed in claim 1, in which the said indicator is mounted in said trainer.

3. The structure as claimed in claim 1, in which the light source comprises one of a plurality of exciter lamps, each of said lamps being mounted directly over a point on said reference surface representing an assumed radio station and selector means mounted in said trainer for selectively energizing one of said excited lamps.

4. The structure as claimed in claim 1, in which the said indicator is mounted in said trainer and in which the light source comprises one of a plurality of exciter lamps, each of said lamps being mounted directly over a point on said reference surface representing an assumed radio station and selector means mounted in said trainer for selectively energizing one of said exciter lamps.

5. The structure as claimed in claim 1, in which the said photo-electric device includes a pair of light sensitive cells each electrically connected to said indicator and a rotatable screen directionally controlled by said course indicator in response to changes in heading thereof to vary the quantity of light received by each of said cells to thereby vary its respective effect on said indicator.

6. In combination, a reference surface, a course indicator movable relative to said reference surface and having a controlled motion so as to indicate the course of a desired object such as a vehicle, a light source arranged so as to radiate light over said reference surface symmetrically with respect to a predetermined point thereon, a photo-electric device carried by said course indicator, an electrical indicator connected to said photo-electric device for indicating the direction and approximate magnitude of the deviation of said course indicator from a heading directly towards or away from said point on said reference surface and light shielding means for varying the quantity of light received from said source by said photo-electric device in response to deviation of said course indicator from said heading directly towards or away from said point on said reference surface.

7. The structure as claimed in claim 6, in which the photo-electric device includes a pair of light sensitive cells and in which said shielding means is a light dividing screen rotatable in accordance with the change in heading of said course indicator from said heading directly towards or away from said point to thereby vary the quantity of light received by each respective cell.

8. The structure as claimed in claim 6, in which the photo-electric device comprises a pair of "photronic" cells rotatably mounted on said course indicator and directionally controlled by said course indicator and a light dividing screen rotatable with said "photronic" cells for varying the amount of light received by each of said cells.

9. A radio compass simulating device for aviation ground trainers comprising, a reference surface, a light source for symmetrically radiating light over said surface with respect to a predetermined point thereon, a photo-electric device movable relative to said reference surface, an indicator electrically connected to said photo-electric device and a means for varying the quantity of light received from said source by said photo-electric device to cause said indicator to indicate the deviation of said photo-electric device from a heading directly towards or away from said predetermined point on said reference surface.

10. The structure as claimed in claim 9, in which the photo-electric device includes a pair of light sensitive cells each electrically connected to said indicator to cause actuation thereof in opposite directions with a torque proportional to the amount of light received by each cell, the net deflection of said indicator representing the effect of the deviation of said photo cell device from the said heading directly towards or away from the point on said reference surface, and a light dividing screen mounted between said cells and movable therewith to cause a difference in the amount of light received by said cells in response to the said deviation in heading of said photo-electric device.

11. The structure as claimed in claim 1, including a means mounted within said trainer for selectively controlling the intensity of light transmitted from said light source.

12. In combination, an aviation ground trainer universally pivotally mounted for movements simulating those of the flight of an aircraft, a reference chart surface, a course indicator movable relative to said reference surface at a velocity proportional to the simulated velocity in flight of said aircraft and directionally controlled by the movement of said trainer, a light source for radiating light over said reference surface symmetrically with respect to a point on said reference surface representing the location of a simulated radio station, a photo-electric device mounted on said course indicator and controlled by said indicator to receive light transmitted from said source in accordance with the heading of said course indicator relative to said simulated radio station point on said reference surface, an indicator in said trainer electrically connected to said photo-electric device for indicating the heading of said course indicator relative to said simulated radio station point.

CARL J. CRANE.

REFERENCES CITED

The following references are of record in the file of this patent:

UNITED STATES PATENTS

| Number | Name | Date |
|---|---|---|
| 1,825,462 | Link | Sept. 29, 1931 |
| 2,099,857 | Link | Nov. 23, 1937 |
| 2,119,083 | Link | May 31, 1938 |
| 2,164,412 | Koster | July 4, 1939 |
| 2,179,663 | Link | Nov. 14, 1939 |

OTHER REFERENCES

Air Corps News Letter; vol. 21, No. 6, March 15, 1938, pages 7–8.

Aeronautics Bulletin No. 27, July 1, 1937, published by the Bureau of Air Commerce of the U. S. Dept. of Commerce, pages 26–29.